United States Patent [19]

Edmo

[11] 4,002,106
[45] Jan. 11, 1977

[54] PISTON-CYLINDER MECHANISM
[75] Inventor: Torbjörn Edmo, Harnosand, Sweden
[73] Assignee: Bispgardens Svets & Smide AB, Bispgarden, Sweden
[22] Filed: Mar. 20, 1975
[21] Appl. No.: 560,111
[30] Foreign Application Priority Data
Mar. 22, 1974 Sweden .............................. 7403881
[52] U.S. Cl. ...................................... 92/65; 92/63; 92/75; 92/129; 92/168
[51] Int. Cl.² .......................... F01B 7/10; F16J 1/10
[58] Field of Search ........ 92/65, 62, 63, 75, 130 R, 92/85 A, 129

[56] References Cited
UNITED STATES PATENTS

| | | | |
|---|---|---|---|
| 787,480 | 4/1905 | Tanner | 92/65 |
| 2,876,744 | 3/1959 | Yuhaniak | 92/65 |
| 3,057,205 | 10/1962 | Howard et al. | 92/65 |
| 3,623,694 | 11/1971 | Goldberg | 92/65 |

Primary Examiner—Paul E. Maslousky
Attorney, Agent, or Firm—Cohn, Powell & Hind

[57] ABSTRACT

The present invention is related to a piston-cylinder mechanism for the pivoting or tilting of the platform of a vehicle mounted goods elevator between a raised resting position and a lowered working position, including at least one piston rod slidably movable relative to a piston in the mechanism and uniformly movable by means of a driver together with the piston between a bottom position wherein the platform is lowered and an intermediate position determined by a stop limiting the piston travel, said piston rod being movable relative to the piston between said intermediate position and a position of maximum extension out of the cylinder wherein the platform is swung up, wherein a spring, adapted to be supplied with spring force when the piston rod is moved towards its position of maximum extension out of the cylinder, urges the piston rod from said position in a direction towards the bottom position thereby to initiate at all times a lowering of the platform.

8 Claims, 2 Drawing Figures

PISTON-CYLINDER MECHANISM

BACKGROUND OF THE INVENTION

Goods-elevators for vehicles include a load carrier or platform, the movements of which are controlled by means of a system of piston-cylinder mechanisms, usually comprising on one hand a first pair of mechanisms with the purpose of controlling the raising and lowering movements of the plate, on the other a second pair of mechanisms with the purpose of providing tilting or pivoting movements of the platform into different tilted or inclined positions relative to the horizontal direction. Thus, these latter mechanisms have to provide for the tilting of the plate within an upper range from a raised vertical position coming into question during the travel of the vehicle to a position approximately horizontal or inclined upwardly from the horizontal direction, and from there further into a lower movement range limited by said position inclined upwardly from the horizontal direction and a position inclined, as desired, downwardly from the horizontal direction.

Piston-cylinder mechanisms for this purpose have usually operated with a constant speed, giving at all times substantially one and the same speed to the pivoting or tilting movement of the plate. Since this speed, for the reason of manipulation techniques etc., has to be relatively low in the lower movement range wherein the plate pivots between its position inclined upwardly from the horizontal direction and its downwardly inclined position, the fact that the piston-cylinder mechanisms operate with one speed solely involves that a low speed was necessarily obtained also in the upper movement range, whereby the total time required to raise and lower the plate respectively was comparably great. To the operator operating the goods elevator, who frequently works under narrow time limits, this unnecessarily long waiting time has been extremely irritating, and this circumstance has contributed greatly to delay and deteriorate the whole manipulation process in which the operation of the goods elevator is comprised as a stage.

To avoid as far as possible the above disadvantages the French Pat. No. 2,173,861 proposes to design the piston-cylinder of mechanism with a narrow piston rod telescopically movable in relation to the wider piston of the mechanism whereby the piston rod will be movable with two different speeds, in fact on one hand a comparably low speed when the piston as well as the piston rod move, on the other a comparably high speed when the piston rod alone moves. While this piston-cylinder mechanism per se permits a variation of the speed at which the elevator platform is pivoted between different swivelling positions, at least one serious disadvantage is involved thereto. Thus the piston rod is movable solely through an interlude between, on one side, the pressure liquid of the mechanism, and on the other the weight of the platform. More particularly, the raising of the platform is performed by introduction of pressure liquid into the operation chamber of the mechanism, while the lowering of the platform is effected by the proper weight of the platform, which is relied upon to return the piston rod into its bottom position. This involves in practice that the platform will at times lock itself in the raised position, since the platform has in some situations no possibility of influencing the piston rod of the mechanism through its own weight.

SUMMARY OF THE INVENTION

Object of the present invention is to eliminate the disadvantages of prior piston-cylinder mechanisms by the provision of a piston-cylinder mechanism, which is primarily characterized by the fact that the spring — which is adapted to be supplied with spring force when the piston rod is moved towards its position furthermost projecting from the cylinder — tends to move the piston rod from said position in a direction towards the bottom position to thereby initiate at all times the lowering of the platform.

In the piston-cylinder mechanism according to the invention it is at all times assured that the platform is moved by means of said springs into a position wherein the proper weight of the platform can cause the piston and piston rod to return into the bottom position in which the platform is lowered. This regardless of whether the platform, e.g. in a rear mounted elevator, is inclined forwardly from its dead center, which may be the case when the vehicle is parked on a downward slope.

With reference to the appended drawings, below follows a more particular description of an embodiment of the invention cited as a non-limiting example.

DESCRIPTION OF THE PREFERRED EMBODIMENT

Figure 1:
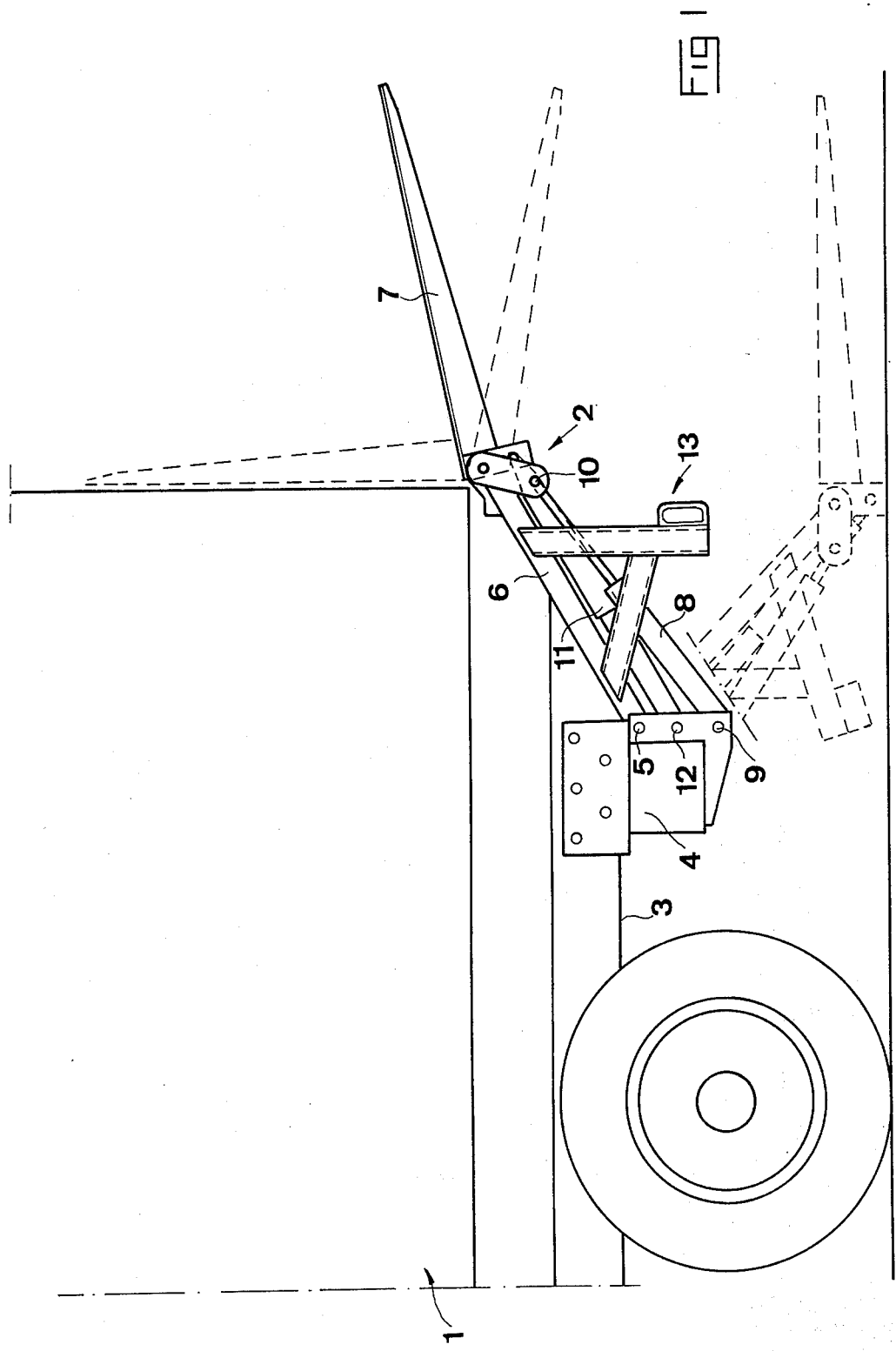
FIG. 1 is a side view of a goods elevator provided in a vehicle, more particularly in the form of a rear mounted elevator.

In FIG. 1, 1 designates generally a load vehicle of an arbitrary kind, which is equipped with a goods elevator in the form of a rear mounted elevator generally designated by 2. A frame or chassis of the vehicle is designated by 3.

The elevator 2 comprises a base portion or attachment box 4 which is secured to the vehicle frame 3, e.g. through welding or riveting. To this base portion 4 are connected two arms 6 which are pivotable about hinges 5 of the base portion 4 and only one of which is visible in FIG. 1, since the other is disposed at the opposite side of the vehicle. The arms 6 are, in turn, at their ends facing away from the hinges 5 connected to a load carrier 7, preferably in the form of a plate extending substantially over the whole width of the vehicle. Each of the pivotable arms 6 is adapted to co-operate with a first piston-cylinder mechanism 8 which is pivotable about a second hinge 9 of the base portion 4 and connected to the load carrier 7 at a bracket 10. It is obvious that the load carrier 7 can be raised and lowered to a desired level through pivoting the arms 6 through extension and retraction respectively of the piston rod in the piston-cylinder mechanism 8.

To provide for the pivoting or tilting of the load carrier 7 between the raised vertical position shown by dash lines and a lowered position, e.g. horizontal or inclined upwardly or downwardly from the horizontal direction, a second pair of piston-cylinder mechanisms 11 is provided which are at one end pivotally connected to the base portion 4 by hinges 12, and at the opposite end likewise pivotally connected to the load carrier or plate 7.

On the pivoting arm 6 there may preferably be provided a drive-in guard of the kind known per se.

Figure 2:
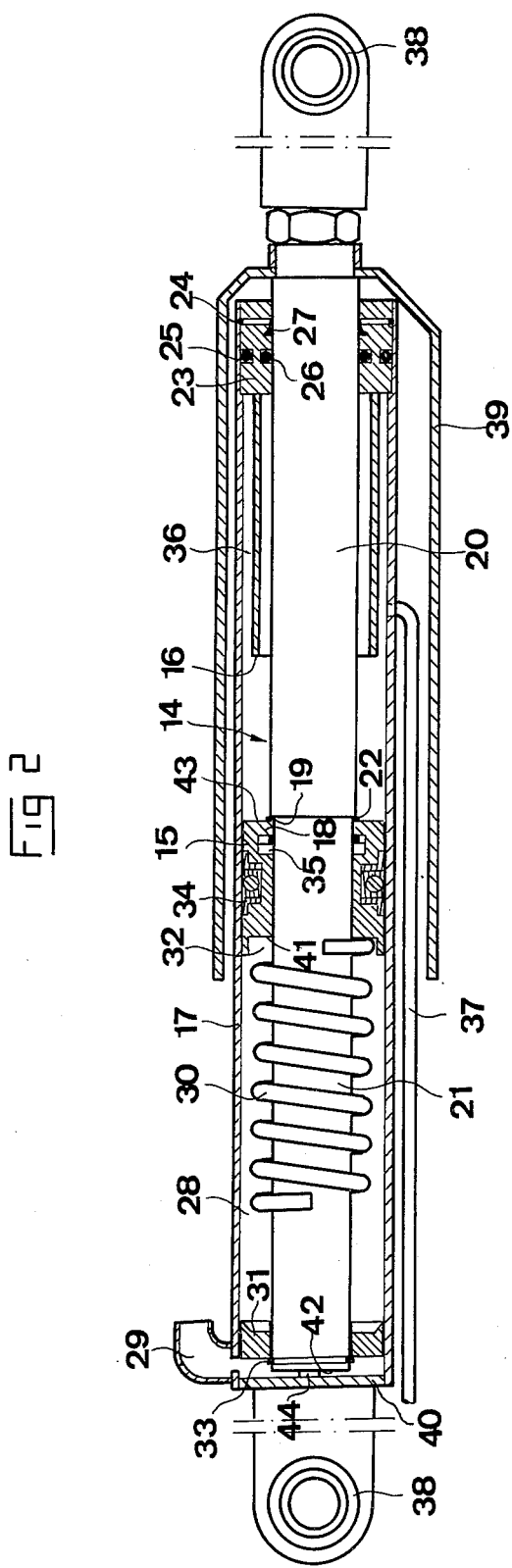
FIG. 2 is an enlargement of a piston-cylinder mechanism comprised in the goods elevator and designed in accordance with the invention.

Now reference is made to FIG. 2 which shows more in detail one of the two piston-cylinder mechanisms 11 comprised in the goods elevator for the pivoting or tilting of the plate 7. A piston-rod 14 in this mechanism is slidably movable relative to an associated piston 15, but is by means of a driver uniformly movable together with the piston between the starting position 15 and an intermediate position determined by a stop 16 limiting the travel of the piston 15, the piston rod 14 being movable relative to the piston 15 between said intermediate position and a position furthermost extended out of the cylinder 17.

Said driver consists in this case of the interior portion 18 of the piston 15, engaging or being engaged by and thereby co-operating with a shoulder 19 formed in the transition between a piston rod portion having a greater diameter than the piston rod portion 21. As shown in FIG. 2 a support ring 22 may, if desired, be provided between the shoulder 19 and the piston 15.

The above-mentioned stop 16 comprises one or a plurality of stiff or rigid members which are exclusively attached to a flank wall 23 of the cylinder 17, in fact the flank wall 23 through which the piston rod 14 extends. In this case the stop 16 consists simply of a tube which is secured, e.g. by welding, to the inner side of the flank wall 23. The flank wall 23 is dismountably or detachably secured to the remaining portion of the cylinder 17. More particularly the flank wall 23 is formed as a robust ring, which is secured inside one end of the cylinder 17 by means of a locking ring 24. The wall or ring 23 has, on one hand, an exterior seal 25 to the inner side of the cylinder 17, and, on the other, an interior seal 26 to the body surface of the piston rod 14. Both of these seals 25 and 26 consist preferably of O-rings. Further, the flank wall 23 comprises preferably a wiper designated by 27.

The operation chamber of the cylinder 17 located at the left-hand side of the piston 15 in FIG. 2 is designated by 28. Into the operating chamber 28 a conduit 29 opens which is connected to an arbitrary pressure medium source not shown in the drawings.

The mechanism may operate either with a pneumatic or a hydraulic pressure medium, while it is here preferred to use a hydraulic medium.

According to the invention the piston-cylinder mechanism 11 includes a spring 30 tending, when the piston rod 14 is in its position furthermost extending out of the cylinder 17, to move the piston rod 14 in a direction towards its initial position. In this case the spring 30 consists of a compression spring, preferably a helical compression spring, which is adapted, when the piston rod 14 approaches its position furthermost extending out of the cylinder 17, to be compressed between on one hand a first part fixed to the piston rod 14, and on the other a second portion being at least during the compression phase fixed or stationary relative to the cylinder 17. In the embodiment shown, the compression spring 30 is lodged in the operating chamber 28 of the cylinder 17, said above-mentioned first part that provides the compression of the spring 30 consisting of a ring 31 disposed at or adjacent the inner end of the piston rod 14, while the second part consists of the piston 15. To accommodate the spring 30 a seat 32 is recessed into the piston 15. The ring 31 is retained in place or positioned by a locking ring 33.

According to the invention the length of the spring 30 is equal to and preferably less than the difference between the travel of the piston rod 14 and the travel of the piston 15, whereby the spring 30 will operate solely during the movement of the piston rod 14 relative to the piston 15.

The piston 15 has in a conventional manner, an exterior seal 34 sealing to the inner side of the cylinder 17, besides which an interior seal 35 is provided to seal to the body surface of the piston rod portion 21.

In practice leakage of hydraulic liquid might occur from the operation chamber 28 through any of the seals 34 and 35 into the cylinder base 36. To collect such leaking liquid a return conduit 37 is provided which opens behind the front edge of the stop 16 and conveys the liquid back to the pressure medium source of the mechanism.

The mechanism is in a conventional manner provided with two pivot bearings 38; one disposed at one flank of the cylinder 17 and the other disposed at the free end of the piston rod 14. To ensure that the pressure of the pressure medium can be brought to bear on the end surface 42 of the piston rod 14 at the position of the piston rod 14 furthermost inserted into the cylinder, a stop lug 44 is provided on the piston rod 14 in order to provide a space between the remaining end surface 42 of the piston rod 14 and the end wall 40 of the cylinder 17. This may instead thereof also be effected by providing a stop, not shown, for the plate 7 of the goods elevator, i.e. said stop will ensure that the end surface 42 of the piston rod will not at the lower position of the goods elevator plate 7 come into contact with the cylinder end wall 40.

At the free end of the piston rod 14 may as shown in FIG. 2 a protective cover 39 be provided.

The piston-cylinder mechanism described operates in the following manner:

In FIG. 2 the piston rod 14 is shown in a bottom position having the stop lug 44 of the piston rod 14 abutting on the end wall 40 of the cylinder 17. In this position the plate 7 of the goods elevator is lowered into a position of maximum inclination to the horizontal direction (see FIG. 1). To pivot the plate 7 upwardly hydraulic liquid is supplied by the conduit 29 into the operation chamber 28. Of course, there is no seal around the ring 31 and there is sufficient clearance for the passage of fluid. The pressure of the hydraulic liquid introduced into the operation chamber 18 will act on the end surface 41 of the piston 15, and on the end surface 42 of the piston rod 14, the piston 15 and piston rod 14 then moving due to the driver arrangement 18-19 to the right hand in FIG. 2 with an even, relatively low speed. After the piston 15 and piston rod 14 have moved a length corresponding to the distance between the end surface 43 of the piston 15 and the front edge of the stop tube 16 further movement of the piston 15 is stopped. The travel that the piston 15 and the piston rod 14 performed in this action corresponds to what is required to pivot the plate 7 from the downwardly inclined position into the position inclined upwardly from the horizontal direction, shown by full lines in FIG. 1. By a continued pumping of hydraulic liquid into the operation chamber 28 the piston rod 14 alone is capable of moving further. By the fact that the piston 15 is now stationary the partial pressure on the end surface 42 of the piston rod 14 will increase. This on the condition of a constant or unchanged supply of hydraulic liquid into the operation chamber 28. As a consequence of the increased partial pressure on the piston rod 14 the same will move at a speed depending on the ratio between the cross sectional area of the piston rod 14 and the cross sectional area of the piston 15. The smaller the cross sectional area of the piston rod 14 is in relation to the cross sectional area of the piston 15, the greater the speed increase will be. It will be obvious from the above that the piston rod 14, during the swivelling up of the plate 7 from the position inclined upwardly from the horizontal direction into the vertical position corresponding to the position of maximum projection of the piston rod 14, will move considerably swifter than during swivelling within the lower range of movement.

During the later phase of the movement of the piston rod 14 out of the cylinder 17 the spring 30 will be compressed by the ring 31 and obtain a maximum spring force when the piston rod 14 attains its extreme position. When the load plate 7 is to be lowered from its vertical raised position, the spring 30 will, as soon as the hydraulic pressure ceases, swiftly and positively activate the piston rod 14 through the spring 30 in such a manner that the piston rod will be moved into the cylinder and the plate 7 pivoted somewhat from the vertical position. Thereby an initial pivoting of the plate 7 will be obtained so as to supply thereto, through its proper weight, a torque that swings the plate 7 swiftly and efficiently down into the position inclined upwardly from the horizontal direction shown with full line in FIG. 1.

It is understood that by selection of the length of the stop 16 in relation to the positioning of the driver shoulder 19 it will be possible to vary the position of the plate 7 in which a change in the movement speed is desired.

It will be understood that the invention is not limited solely to the embodiment described and shown in the drawings. Thus the piston-cylinder mechanism according to the invention is not only applicable in connection with goods elevators and other lifting devices but as well in any context whatsoever wherein a variation of the movement speed of the piston rod 14 of the mechanism is desired. Further, the invention is not limited to a piston-cylinder mechanism, the piston 15 of which can be supplied with two different movement velocities solely. It is thus conceivable to provide in one and the same cylinder, two or a plurality of telescopically or otherwise slidable piston rods, each having a piston co-operating with a particular stop.

Thereby the speed variation will be possible to obtain not only in one but in two or more steps. Likewise a plurality of modifications of the embodiment shown in FIG. 2 may be undertaken. The spring 30 may, for example, be lodged in the space 36 instead of in the operation chamber 28, and it is also conceivable to use tension springs instead of compression springs. The design of the stop 16 may be varied in various manners though it is preferable to attach the same to the dismountable flank wall 23. The stop lug 44 is shown in the example as a body projecting from the end surface 42 of the piston rod 14 to the end of utilizing the pressure of the pressure medium to operate actively on the end surface 42 in the retracted position of the piston-cylinder mechanism, but it may possibly be replaced by a convexity in the end surface 42 of the piston rod. Various other modifications are possible within the scope of the appended claims.

I claim as my invention:

1. A piston-cylinder mechanism for the pivoting or tilting of a platform of a vehicle mounted goods elevator between a raised resting position and a lowered working position, including:
   a. a cylinder,
   b. a piston movably mounted in the cylinder,
   c. a piston rod slidably movable through the piston, and movable in the cylinder between a bottom position wherein the platform is lowered and a position of maximum extension out of the cylinder wherein the platform is raised,
   d. a driving means connecting the piston and piston rod for moving the piston and piston rod together from the bottom position,
   e. a stop in the cylinder limiting travel of the piston and determining an intermediate position of the piston rod, the piston rod being movable relative to the piston between the intermediate position and the position of the maximum extension,
   f. spring-engaging means carried by the piston rod, and
   g. a spring engaging the spring-engaging means and tending to urge the piston rod from the position of maximum extension in a direction toward the bottom position whereby to initiate at all times a lowering of the platform, the length of the spring being no longer than the difference between the piston rod travel and the piston travel so that the spring is operative solely during the movement of the piston rod relative to the piston and tends to move the platform into a position wherein the proper weight of the platform can cause the piston rod to return to the bottom position in which the platform is lowered.

2. A piston-cylinder mechanism as defined in claim 1, in which:
   h. the spring-engaging means is carried by the piston rod substantially near its inner end, and
   i. the spring is a helical compression spring compressed between the spring-engaging means and the piston.

3. A piston-cylinder mechanism as defined in claim 2, in which:
   j. a seat is recessed into the piston to receive the spring.

4. A piston-cylinder mechanism as defined in claim 1, in which:
   h. the cylinder includes a flank wall through which the piston rod extends, and
   i. the stop comprises a rigid member attached to the flank wall of the cylinder and extending into the cylinder.

5. A piston-cylinder mechanism as defined in claim 4, in which:
   j. the flank wall is detachably connected to the cylinder.

6. A piston-cylinder mechanism as defined in claim 4, in which:
   j. the flank wall is provided by a robust ring located inside the cylinder,
   k. a locking ring secures the robust ring to the cylinder,
   l. an exterior seal is located operatively between the robust ring and the cylinder, and
   m. an interior seal is located operatively between the robust ring and the piston rod slidably extending through the robust ring.

7. A piston-cylinder mechanism as defined in claim 6, in which:
   n. the stop consists of a tube attached to the robust ring and extending into the cylinder.

8. A piston-cylinder mechanism for the pivoting or tilting of a platform of a vehicle mounted goods elevator between a raised resting position and a lowered working position, including:
   a. a cylinder,
   b. a piston movably mounted in the cylinder,
   c. a piston rod slidably movable through the piston, and movable in the cylinder between a bottom position wherein the platform is lowered and a position of maximum extension out of the cylinder wherein the platform is raised,
   d. a driving means connecting the piston and piston rod for moving the piston and piston rod together from the bottom position,
   e. a stop limiting travel of the piston and determining an intermediate position of the piston rod, the piston rod being movable relative to the piston between the intermediate position and the position of maximum extension,
   f. a ring secured to the piston rod substantially near its inner end,
   g. means communicating with said cylinder for supplying pressurized fluid to the inner end of the piston rod,
   h. means for passing the pressurized fluid past the piston rod ring to act on the piston, and
   i. a helical compression spring disposed about the piston rod between the piston and piston rod ring, the length of the spring being no longer than the difference between the piston rod travel and the piston travel so that the spring is operative solely during the movement of the piston rod relative to the piston and tends to move the platform into a position wherein the proper weight of the platform can cause the piston and piston rod to return to the bottom position in which the platform is lowered.

* * * * *